United States Patent
Chen et al.

(10) Patent No.: US 6,876,894 B1
(45) Date of Patent: Apr. 5, 2005

(54) FORECAST TEST-OUT OF PROBED FABRICATION BY USING DISPATCHING SIMULATION METHOD

(75) Inventors: Nai-Chiang Chen, Taipei (TW); Ta-Chin Lin, Taipei (TW); Joseph Chang, Hsin chu (TW); Chung-Shen Chen, Tainan (TW); Vincent Chiu, Tenwei (TW)

(73) Assignee: Taiwan Semiconductor Maufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/701,960

(22) Filed: Nov. 5, 2003

(51) Int. Cl.[7] .............................................. G06F 19/00
(52) U.S. Cl. ...................... 700/100; 700/117; 700/121; 705/26
(58) Field of Search ................... 700/97, 99, 100–108, 700/117, 121, 33; 705/8–10, 26

(56) References Cited

U.S. PATENT DOCUMENTS

| | | | | |
|---|---|---|---|---|
| 5,826,040 | A | | 10/1998 | Fargher et al. ............. 395/208 |
| 6,105,520 | A | * | 8/2000 | Frazer et al. ............... 112/117 |
| 6,185,469 | B1 | | 2/2001 | Lewis et al. .................. 700/99 |
| 6,201,999 | B1 | * | 3/2001 | Jevtic .......................... 700/100 |
| 6,263,303 | B1 | | 7/2001 | Yu et al. ........................ 703/19 |
| 6,546,300 | B1 | * | 4/2003 | Fukuda et al. .............. 700/100 |
| 6,615,097 | B2 | * | 9/2003 | Ozaki .......................... 700/121 |

OTHER PUBLICATIONS

"Modeling and Analyzing Workflow Using a Petri–New Based Approach," van der Aalst et al., Proc. 2nd Workshop on Computer–Supported Coop. Work, Petri Nets and Related Formalisms, pp. 31–50, 1994.

"Generic Workflow Models: How to Handle Dynamic Change and Capture Management Information?," van der Aalst, Proc.–1999 IFCIS Int'l Conf. on Coop. Info. Systems, 1999 Edinburgh, UK, pp. 115–126.

"Modeling, Scheduling and Prediction in Wafer Fabrication Systems Using Queuing Petri Net and Genetic Algorithm", Wen et al., Proc. 2001 IRCA. IEEE Int'l Conf. on Robotics & Automation, 2001, vol. 4, pp. 3559–3564.

"Modeling and Performance Analysis of Workflow Management Sys. Using Timed Hierarchicad Colored Petri Nets, " Salinifard et al., Proc. ICGIS 2002, vol. 2, pp. 843–845.

"Petri Net Based Modeling of Job–Shop Resource Allocation in Generic Prototyping Approach," Neau, IEEE Int'l Conf. on Sys., Man, and Cybernetics, 1998, vol. 1, pp. 96–100.

"Deadlock–Free Scheduling of Flexible Manufacturing Systems Based on Heuristic Search and Petri Net Structures," Jong et al., IEEE Int'l Conf. on Sys., Man, and Cybernetics, 1998, vol. 1, pp. 26–31.

* cited by examiner

*Primary Examiner*—Kidest Bahta
(74) *Attorney, Agent, or Firm*—Haynes and Boone, LLP

(57) ABSTRACT

A method and apparatus for simulating the functioning of various configurations of fabrication and test equipment within a manufacturing line creates a schedule for dispatching of the production lots to the manufacturing line. Based on the product mix forecast, the product volume forecast, the predicted sales schedule, the sales confidence, the actual sales order descriptions, and the product delivery schedule, a potential product dispatch schedule is established that enables a product to be fabricated within the manufacturing line. An equipment dispatch schedule for equipment employed in fabrication and testing of the product to be fabricated is defined according to the product dispatch schedule. The potential product dispatch schedule is then simulated based on the process and test equipment model. Upon completion of the simulation, the potential product dispatch schedule is assessed for optimization.

20 Claims, 12 Drawing Sheets

FIG. 1 — Prior Art

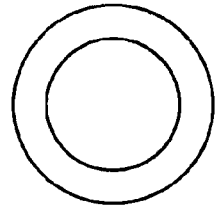
COMMUNICATION
PLACE
FIG. 5a
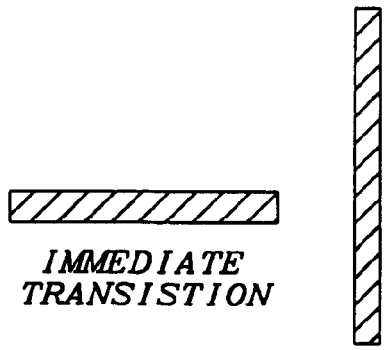
IMMEDIATE
TRANSISTION
FIG. 5b
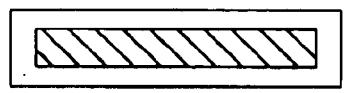
MOCROTRANSITION
(SUB-NET OF PETRI-NET)
FIG. 5c
TIME TRANSITION
FIG. 5d
MAPPING TRANSITION
FIG. 5e
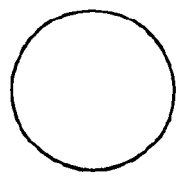 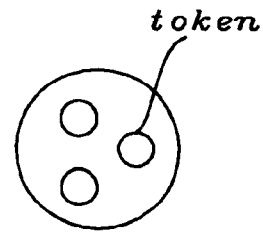
FIG. 5f
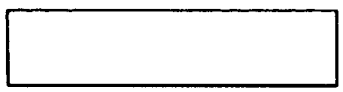
STOCHASTIC
TRANSITION
FIG. 5g

FORECAST TEST-OUT OF PROBED FABRICATION BY USING DISPATCHING SIMULATION METHOD

BACKGROUND OF THE INVENTION

1. Field of the Invention

This invention relates to systems and methods that automatically schedules and dispatches orders for the fabrication and testing of products to a manufacturing line. More particularly, this invention relates to systems and methods for simulating and predicting the operation of a manufacturing line that provides an efficient schedule for the fabrication and testing of the products.

2. Description of Related Art

Automated manufacturing systems have improved the productivity of manufacturing firms. The tool elements of a manufacturing system must be organized to produce the total product set that is marketed by the firm. To insure that the total elements are used efficiently, a manufacturing execution system (MES) includes a facility that controls the scheduling and dispatching of production lots to the manufacturing line. Upon scheduling the production lots, the tool elements are configured for production and appropriate testing systems are installed to verify of the quality and functioning of the product being fabricated. Dispatching the production lots may be affected by a number of factors such as types of equipment needed for the fabrication and testing, maintenance of the equipment, arrival of high priority orders (hot lot or super hot lot) that are not anticipated within the scheduling of the production lots, delays in requests for production, etc.

Traditionally the method executed by MES scheduling and dispatch facility, as shown in FIG. 1, receives forecasting and scheduling information from the marketing and sales database. This forecasting and scheduling information includes the product mix forecast 5, the product volume forecast 10, the predicted sales schedule 15, the sales confidence 20, the actual sales order descriptions 25, and the produced delivery schedule 30. The product mix forecast 5 and the actual sales order descriptions 25 provide a listing of the types of products to be fabricated. The listing of products is used to acquire the product process description 35 detailing the types of manufacturing equipment capabilities and capacities needed to fabricate the products as predicted and ordered. Once the required equipment is identified, the process equipment inventory 40 is retrieved. From the above information, a process equipment requirement and allocation plan is created (Box 45). The process equipment requirements and allocation plan 52, the allocated process equipment capability 50, and the allocated process equipment capacity 55 are used to generate (Box 60) a process equipment schedule. The process equipment schedule 62, the status of the lots of product at each stage of fabrication 65, and an equipment dispatch algorithm 70 are used for dispatching (Box 75) the processing equipment for the fabrication and testing of the product. Upon dispatching (Box 75) and configuring the equipment, the product such as semiconductor wafers is processed (Box 80) to complete the fabrication and testing.

"Modeling and Analyzing Workflow Using a Petri-Net Based Approach", van der Aalst et al., Proceedings $2^{nd}$ Workshop on Computer-Supported Cooperative Work, Petri Nets and Related Formalisms, pp. 31–50, 1994 describes high-level Petri nets used to model systems in a variety of application domains, ranging from protocols to logistics. The high-level Petri nets are used to model (1) the workflow in an office environment and (2) the workflow management system to support the control of office work.

"Generic Workflow Models: How To Handle Dynamic Change and Capture Management Information?", van der Aalst, "Proceedings—1999 IFCIS International Conference on Cooperative Information Systems, 1999, Edinburgh, UK, pp: 115–126, describes two problems related to adaptive workflow: (1) providing management information at the right aggregation level, and (2) supporting dynamic change, i.e., migrating cases from an old to a new workflow. These two problems are tackled by using generic process models employing Petri nets to illustrate the main concepts.

"Modeling, Scheduling, And Prediction in Wafer Fabrication Systems Using Queuing Petri Net and Genetic Algorithm", Wen et al. Proceedings 2001 ICRA. IEEE International Conference on Robotics and Automation, 2001, vol.4, pp: 3559–3564 provides a modeling tool called queuing-Petri net (Q-PN) which combines the characteristics of queuing theory and Petri nets. It can be used to model various details of the manufacturing systems as well as to efficiently evaluate its performance. A general Q-PN model is presented to simulate the semiconductor manufacturing system. Based on this model, a genetic algorithm (GA) based scheduler and an analysis-based predictor is described.

"Petri Net Based Modeling of Job-Shop Resource Allocation in Generic Prototyping Approach", Neagu, IEEE International Conference on Systems, Man, and Cybernetics, 1998, vol.1, pp: 96–100, presents the decision control Petri nets (DCPN) structure for behavior modeling in discrete event systems. In the case of components with inherit decision-making capabilities, this structure proposes the decision transition mechanism to activate suitable decision support resources. A multi-agent simulator is envisaged to generate a scheduling solution based on job-shop representation as a network of interconnected resource allocation center.

"Deadlock-Free Scheduling of Flexible Manufacturing Systems Based on Heuristic Search and Petri Net Structures", Jeng et al. IEEE International Conference on Systems, Man, and Cybernetics, 1998, vol.1, pp: 26–31 proposes a modified best-first algorithm and applies it to a flexible manufacturing system with assembly. A heuristic function based on the Petri net structure and dynamics is presented. The heuristic function consists of two parts. The first part estimates the total remaining operation time for all jobs considering system dynamics. The second part approximates the maximal total remaining operation time for each job.

"Modeling and Performance Analysis of Workflow Management Systems Using Timed Hierarchical Colored Petri Nets", Salimifard, et al., Proceedings of ICEIS 2002, Vol. 2, pp 843–846, 2002 illustrates a modeling methodology for workflow management systems based on colored Petri nets. Using an integration method, processes and resources are modeled at the same abstraction level. A process is decomposed into task structures, human resources are considered at role level. Activity based costing is combined with classical temporal analysis of workflow.

U.S. Pat. No. 5,826,040 (Fargher, et al.) describes a method for planning a production schedule within a factory. A capacity model is created by determining contiguous time intervals, partitioning the factory into resource groups, and determining a processing capacity for each of the resource groups for each of the time intervals. Each job to be planned is divided into processing segments that is represented by a corresponding fuzzy set. The fuzzy set representations are inserted and removed within the capacity model until the job is planned. A completion date and a confidence level can be predicted for each of the jobs. In addition, the jobs requirements may be released to the factory and devices fabricated accordingly.

U.S. Pat. No. 6,185,469 (Lewis, et al.) provides methods and apparatus for testing flexible manufacturing systems. Matrix logic equations are used to process data on the event-states of associated Petri nets and to provide rules for the assignment of resources and work pieces to future event-states that correspond with to yet to be performed jobs. The devices start and stop individual resources in response to logic signals. Sensor feedback is obtained for the distribution of work pieces and available resources in the manufacturing system.

U.S. Pat. No. 6,263,303 (Yu, et al.) describes a simulator particularly suited for simulating the hardware/software behavior of embedded systems. The architecture of the simulator permits the hardware and software systems to be modeled as modules with well characterized behaviors. A concise module definition syntax employing Petri-net like transition objects is used to describe module behaviors. A translator operates upon the module to abstract operations of module behaviors at a level which does not require cycle-based, direct interaction of each module with the underlying simulation engine.

SUMMARY OF THE INVENTION

An object of this invention is to provide a method and apparatus for scheduling fabrication and testing equipment within a manufacturing line.

Another object of this invention is to provide a method and apparatus for simulating the functioning of various configurations of fabrication and test equipment within a manufacturing line to create a scheduling for dispatching of the production lots to the manufacturing line.

To accomplish at least one of these objects, a method for scheduling fabrication and testing of product within a manufacturing line begins with the creation of a process and test equipment model for equipment and processes within the manufacturing line. Based on the product mix forecast, the product volume forecast, the predicted sales schedule, the sale confidence, the actual sales order descriptions, and the product delivery schedule, a potential product dispatch schedule is generated for product to be fabricated within the manufacturing line. An equipment dispatch schedule for equipment employed in fabrication and testing of the product to be fabricated is defined according to the product dispatch schedule. The potential product dispatch schedule is then simulated based on the process and test equipment model.

Upon completion of the simulation, the potential product dispatch schedule is assessed for optimization. If the product dispatch schedule is not optimized, another potential product dispatch schedule is generated for the product, regenerating the process and test model, and re-simulating the product dispatch schedule. If the product dispatch schedule is optimized, the products are dispatched for fabrication and test according to the schedule.

The method may also include, upon completion of the simulation a step that determines whether the equipment dispatch schedule is to be changed. If the equipment dispatch schedule is to be changed, modifying the equipment dispatch schedule and re-simulating the product dispatch schedule with the new equipment schedule and determining whether the schedule is optimized.

The process equipment model includes equipment set-up, equipment break-down, and equipment repair. Further, the process equipment model includes a probability factor for unanticipated interruption of fabrication and test of high priority product.

In the preferred embodiment of the method the process and test equipment model is described as a Petri-Net model to express the function of the process equipment during fabrication and test of the product.

The apparatus of this invention is a computer system executing a manufacturing execution program for the scheduling and dispatch of the process and testing equipment within a manufacturing line. The computer system executes a program that performs the above described method.

BRIEF DESCRIPTION OF THE DRAWINGS

FIGS. 5a-5g are a legend for the Petri-nets of FIGS. 6–11

DETAILED DESCRIPTION OF THE INVENTION

Figure 1:
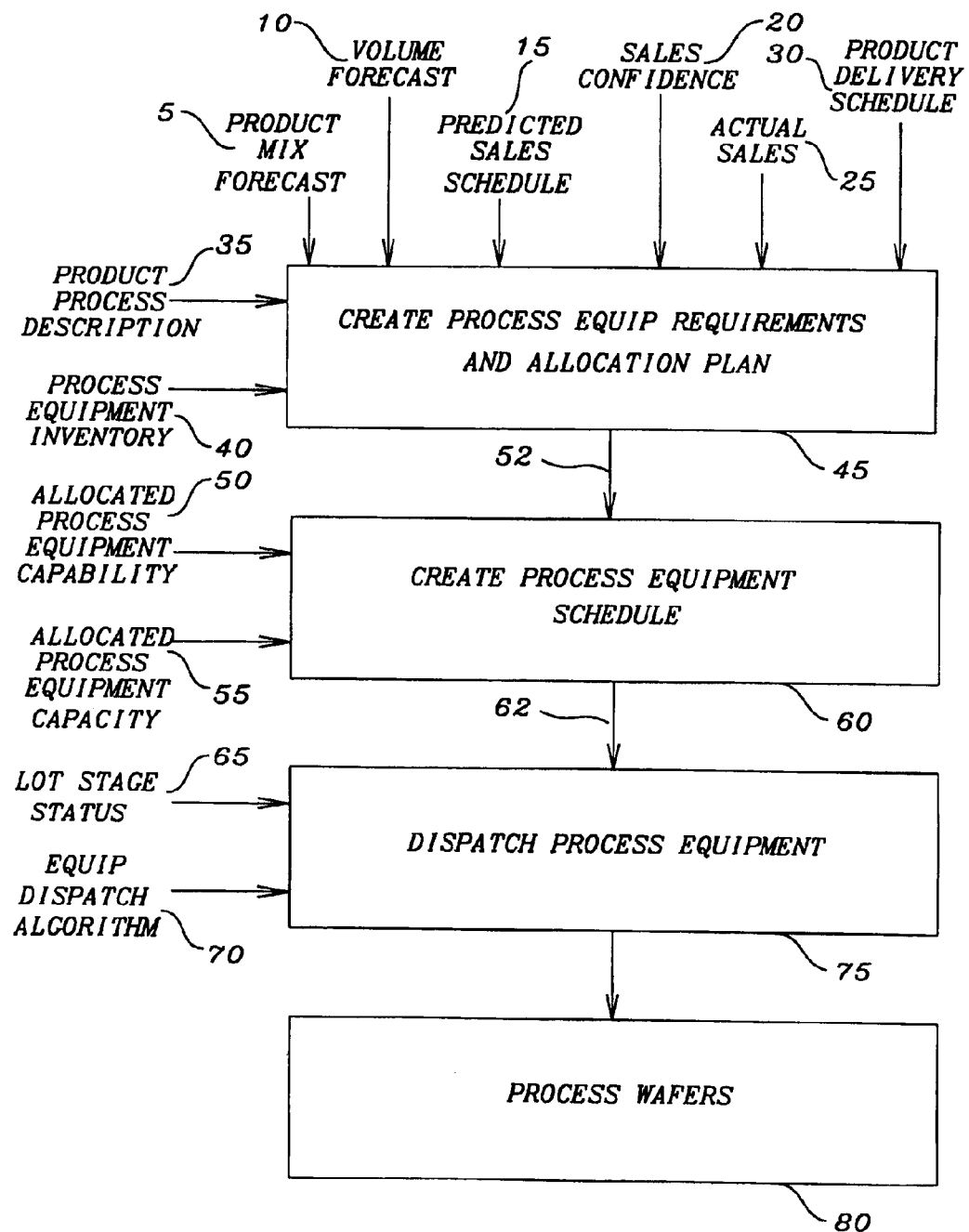
FIG. 1 is a flowchart of the process for scheduling and dispatching lots for fabrication and the testing of product on a manufacturing line of the prior art.

An integrated circuit fabrication and testing system consists of numerous workstations that have equipment with various capabilities and capacities linked by a material handling system. This enables jobs to follow diverse routes through the system. The progress of the fabrication and testing is monitored and controlled by a network of linked computers, microprocessors and data acquisition devices. Different integrated circuit designs can be processed simultaneously with one set-up of the hardware system. Such application flexibility has the great potential to enhance productivity. To realize the enhanced productivity, the production lots must be scheduled such that the capabilities and capacities of the processing and testing equipment are optimized for production of the product. The classic scheduling of the production lots based on the capacity and capabilities of the fabrication and testing equipment generally does not take into account the probabilities of the maintenance of the equipment, arrival of high priority orders (hot lot or super hot lot) that are not anticipated within the scheduling of the production lots and delays in requests for production. This information is used to determine the dispatch algorithm for carrying out the fabrication and testing of the product. In this invention, the product process description is used to create a model of the manufacturing line. A candidate scheduling of the fabrication and testing of the product is simulated using the dispatch algorithm. The simulation results are tested for optimization. The candidate scheduling is modified, if necessary, and the scheduling re-simulated until the appropriate optimized scheduling is determined.

The model of the fabrication and test equipment of the manufacturing line contains the stochastic factors for the probabilities of the maintenance of the equipment, arrival of high priority orders (hot lot or super hot lot) that are not anticipated within the scheduling of the production lots, and delays in requests for production. The model can be further modified for changes in the equipment capabilities and capacities.

A descriptive model that includes sequence control of an integrated circuit fabrication and testing system by Petri net is attractive due to its simplicity. Petri nets provide a graphical description that makes understanding the control flow of a manufacturing system easier. The Petri net enables the modeling of synchronic and uncertain behaviors of a system. The graphical representation of a Petri net can express system behaviors, resources and constraints more easily than other methods. Basic Petri nets used in manufacturing systems are defined by two states (operation places and resource state places) and two classes of transitions (input and output transitions). The place-transition net is represented as a bipartite directed graph. Places are marked by tokens. The maximum number of tokens a place can hold defines its capacity. Points and transitions are connected via directed edges. The number of tokens an edge can transfer defines its weight. A place-transition net is characterized by an initial marking of places and a firing rule.

Figure 2:
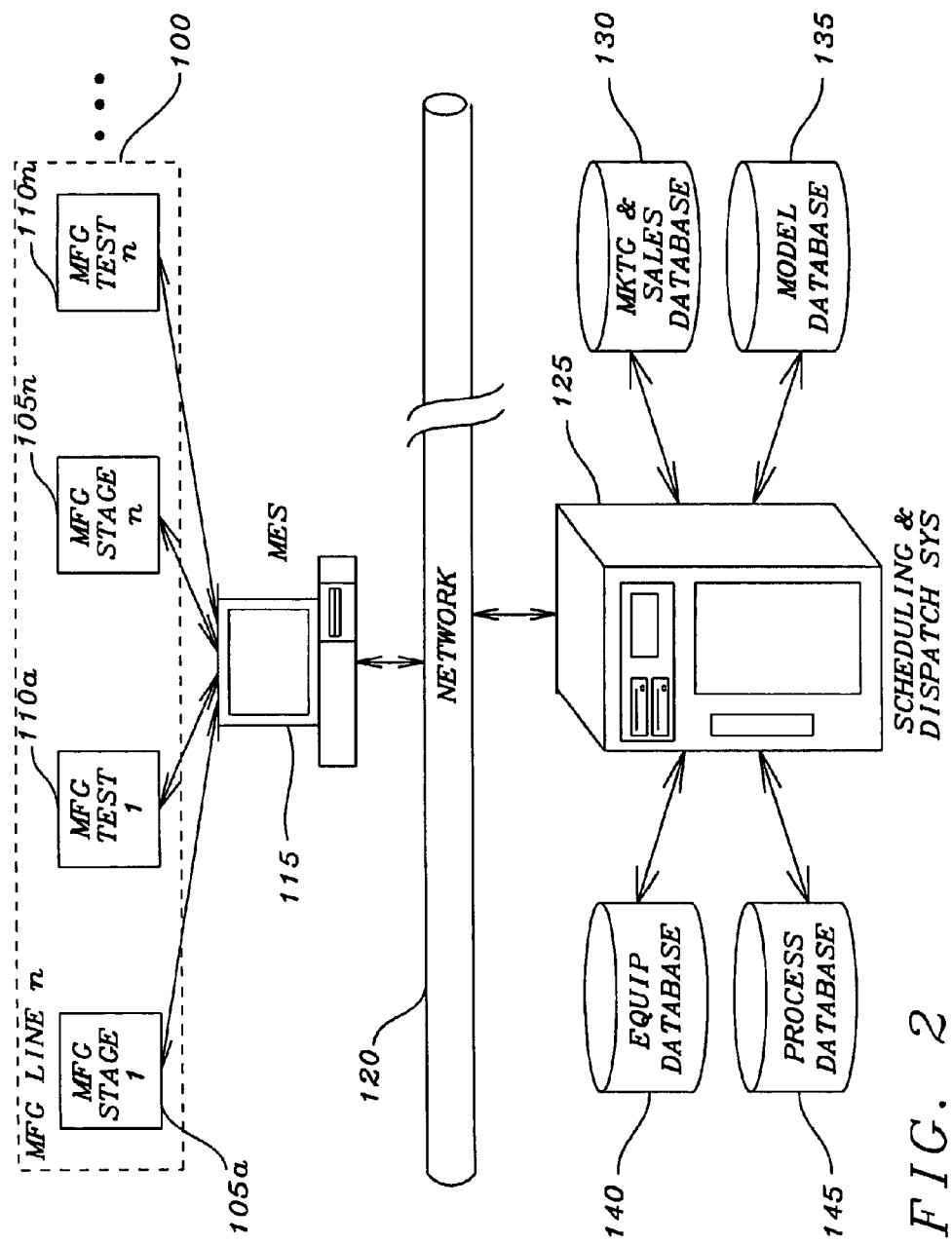
FIG. 2 is a diagram of a scheduling and dispatching system of this invention.

Refer now to FIG. 2 for a description of a product fabrication and testing scheduling and dispatch system of this invention. A manufacturing line 100 within an enterprise has a series of manufacturing stages 105a, ..., 105n and test stations 110a, ..., 110n that are configured for the fabrication and test of products. The manufacturing execution system (MES) 115 receives sensor feedback from the manufacturing stages 105a, ..., 105n and test stations 110a, ..., 110n and provides the necessary control commands such that the manufacturing stages 105a, ..., 105n and test stations 110a, ..., 110n will fabricate and test the products according to a schedule provided by the scheduling and dispatch system 125. The scheduling and dispatching of the lots of product to be fabricated and tested are communicated to the MES system 115 through the network 120.

The scheduling and dispatch system 125 is in communication with the marketing and sales database 130 to retrieve a product mix forecast, the product volume forecast, the predicted sales schedule, the sales confidence, the actual sales order descriptions, and the product delivery schedule. The product mix forecast and the actual sales order descriptions provide a listing of the types of products to be fabricated. The listing of products is used to acquire the product process description from the process database 145. The product process description details the types of manufacturing equipment capabilities and capacities needed to fabricate the products. The process equipment inventory from the equipment database 140 identifies the capacities, capabilities, and locations of the process equipment and test devices necessary for the fabrication and testing of the product. The equipment capabilities and capacities are used to construct a model of the operation of the equipment for each of the manufacturing stages 105a, ..., 105n and test stations 110a, ..., 110n of the manufacturing line 100. The model includes the stochastic factors that govern the maintenance, failure, and operation of the equipment. Further the model is constructed to include the probabilities for the arrival of high priority orders (hot lot or super hot lot) that are not anticipated within the scheduling of the production lots or delays in requests for production.

A candidate production and testing schedule is generated by the scheduling and dispatch system 125 and applied as an input to a simulation of the process equipment model. The results of the simulation are tested for optimization. If they are not optimized, other candidate schedules are generated for simulation. This process is repeated until an optimized schedule is created.

The schedule of product fabrication and test is transferred from the scheduling and dispatch system 125 to the MES system 115 for control of the manufacturing line 100.

Figure 3:
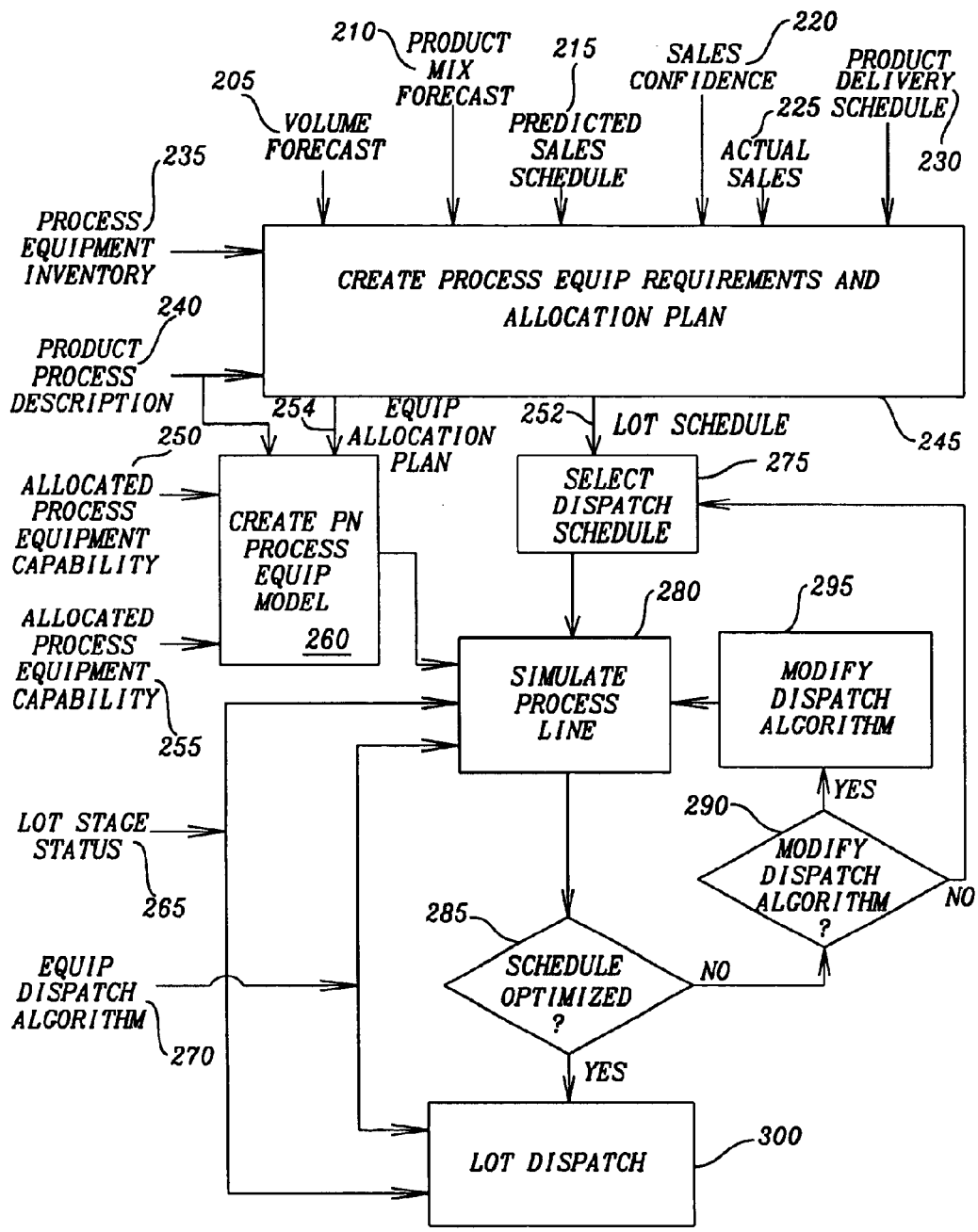
FIG. 3 is a flowchart of the process for scheduling and dispatching for fabrication and the testing of product on a manufacturing line of this invention.

The scheduling and dispatching system executes a process or method as described in FIG. 3. The product mix forecast 215, the product volume forecast 210, the predicted sales schedule 215, the sales confidence 220, the actual sales order descriptions 225, and the product delivery schedule 230 are retrieved from the marketing and sales database 130. The product mix forecast 205 and the actual sales order descriptions 225 provide a listing of the types of products to be fabricated. The listing of products is used to acquire the product process description 240 detailing the types of manufacturing equipment capabilities and capacities needed to fabricate the products from the process database 145. The process equipment inventory 40 as detailed from the product process description 240, is acquired from the equipment database 140. From the above detailed information, an equipment requirements and allocation plan is created (Box 245). The product description for the planned product, equipment allocation plan 254, the allocated process capability 250, and the allocated process equipment capacity 255 provide the necessary information to create (Box 260) a process equipment model. A potential lot scheduling 252 is selected (Box 275) as a candidate schedule. The candidate lot schedule, the lot stage status 265, and the equipment dispatching algorithm 270 are applied as inputs to the process equipment model for simulation (Box 280). The results of the simulation are tested (Box 285) for optimization of the lot schedule. If the lot schedule is not optimized, the dispatch algorithm is examined (Box 290) for needed modification. If modification is needed, the dispatch algorithm is modified (Box 295) and the schedule re-simulated.

If the dispatch algorithm is not modified, another product lot scheduling 252 is selected and re-simulated (Box 280). Once the schedule is optimized the product lot schedule is transmitted and the product lots are dispatched 300 for fabrication and test based on the lot stage status 265 and the equipment dispatch algorithm 270.

In the preferred embodiment of this invention, the process equipment model created (Box 260) is formed using Petri-nets. Petri-nets are especially useful in describing the characteristics of flexible manufacturing systems. The Petri-net permits the description of the fabrication equipment and test stations in a program language that is conveniently executed by a computer system. The programming description of the fabrication equipment and test stations of the manufacturing line are retained by program retention devices such as magnetic and electro-optical discs, random access memory or programmable read only memory. Further, the program description may be retained on storage nodes of a network of computer systems.

Figure 4:
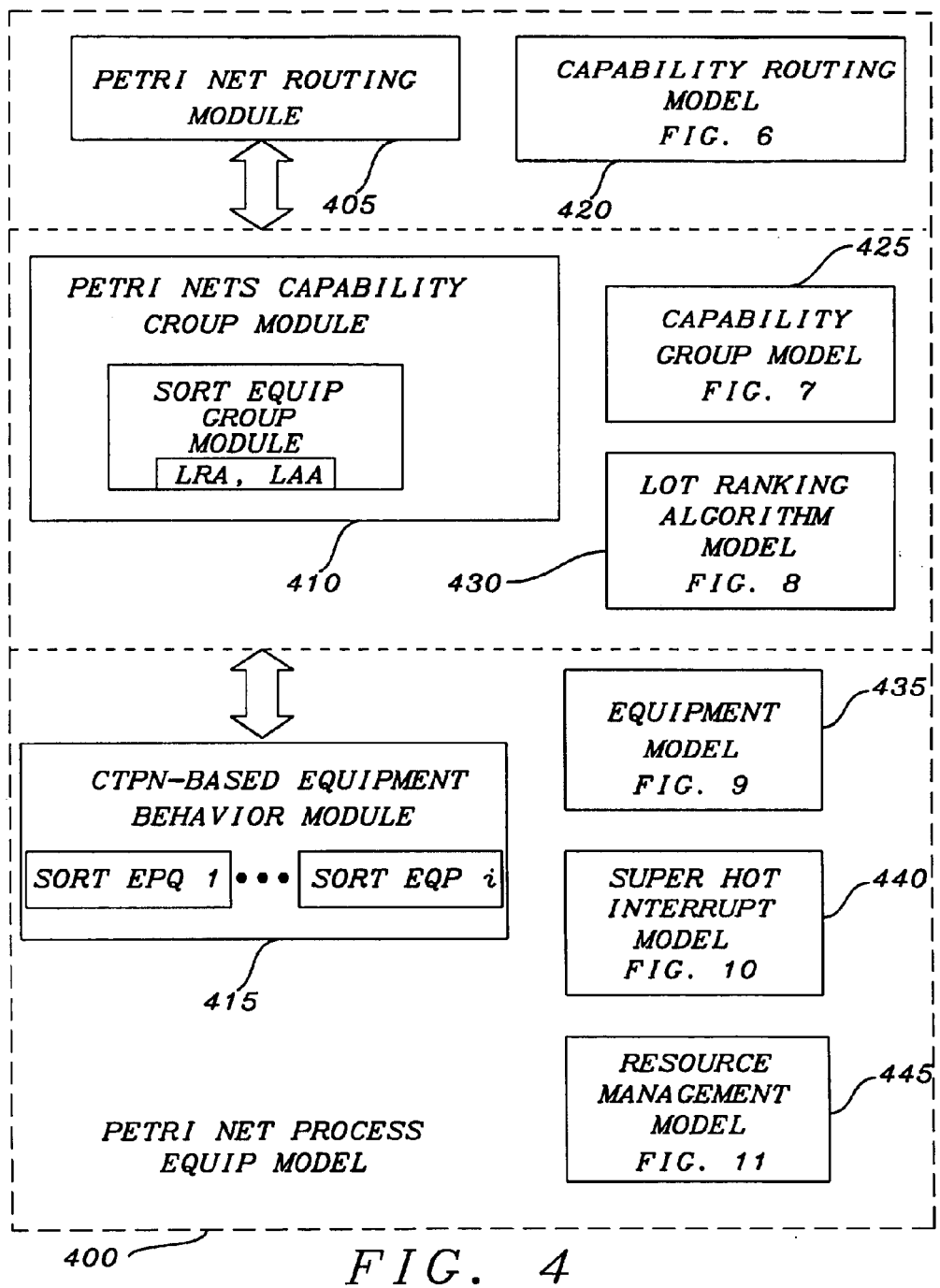
FIG. 4 is a description of the process and test equipment model employing Petri-nets of this invention.

Referring to FIG. 4, a model 400 of the fabrication and test equipment of the manufacturing line as configured for various product lots has three levels for the preferred implementation of the model. In the first level 405 provides a description of the routing for the fabrication and testing of product through the equipment for each different product capabilities required. The second level 410 provides modeling for each of the capabilities for a group of fabrication and test equipment. Included, is a lot ranking algorithm and a lot assignment algorithm that describe any priority given to particular processes required for a particular group of fabrication and test equipment. The third level 415 provides behavior models for the individual fabrication and test equipment employed on the manufacturing line. Further the third level models 415 include the heuristic models for arrival of arrival of high priority product lots (hot lot or super hot lot) that cause interruption to the scheduling and dispatching of lots in a normal flow. Additionally, the third level models 415 include a heuristic representation of the behavior of the equipment encompassing the probabilities of failure and preventative maintenance of the equipment.

Figure 6:
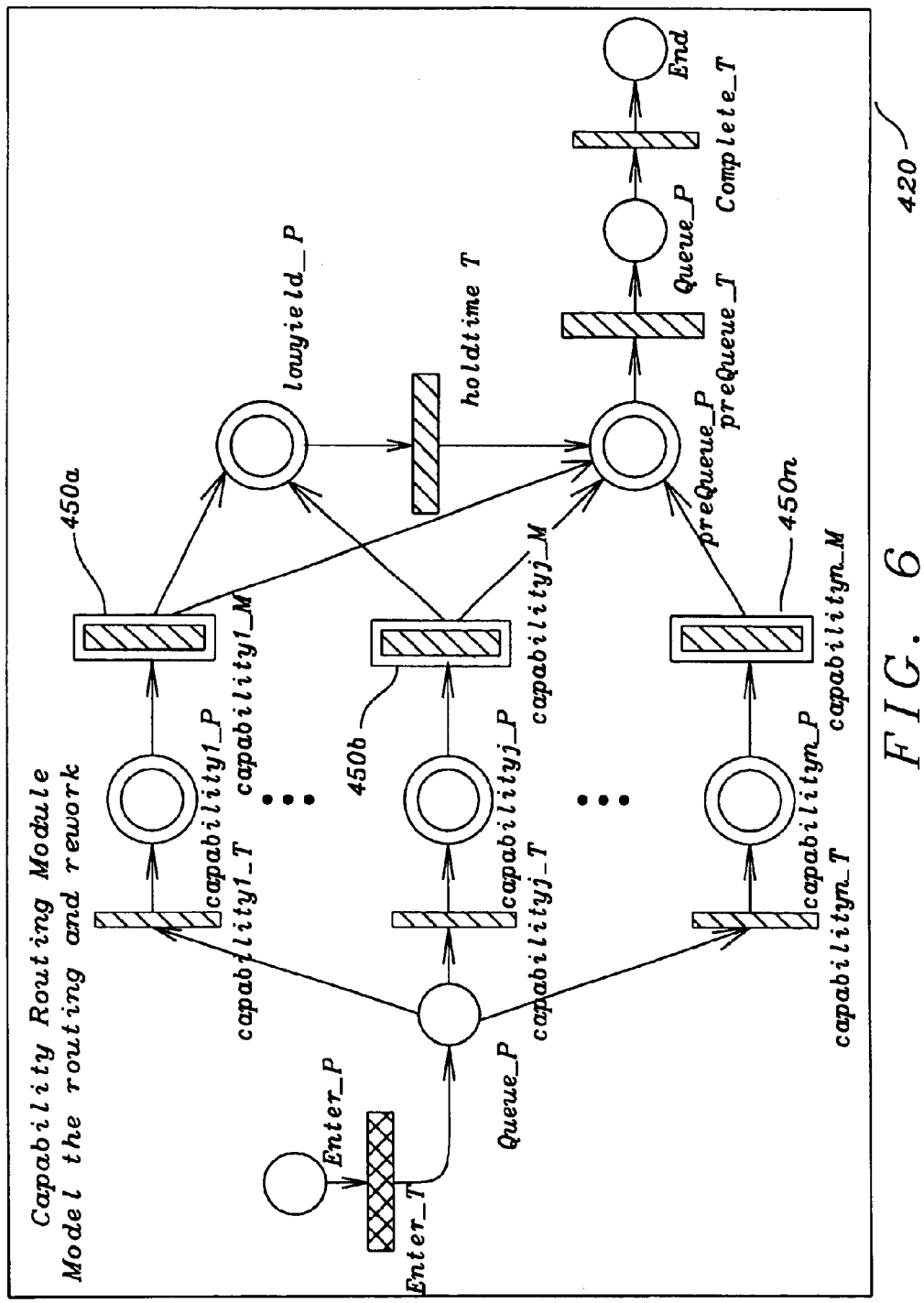
FIGS. 6–11 are diagrams of Petri-nets illustrating the structures of the process and test equipment model of this invention.

An example 420 of the routing module for the first level 405 is as shown in FIG. 6 illustrates a Petri-net for the routing of product through a manufacturing line including any rework to correct errors in fabrication. Refer first to FIGS. 5a–5f to discuss the symbols employed to represent the places and transitions of the Petri-nets used to describe the model of the fabrication and test equipment for the method for scheduling the dispatching product lots of this invention. FIG. 5a illustrates a communication place. A communication place is the place that the product lots enter for transfer to other modules describing other processes of the fabrication and test equipment.

FIG. 5b exemplifies an immediate transition. This is an analogous to an "if-then-else" procedure within a programming process. The simulation of a fabrication and testing process of a particular product is resident within a "place". If certain requirements are met, the next appropriate simulation operation is performed by the model described of the fabrication and test equipment upon the product lot. Otherwise, a default simulation operation is performed by the model described of the fabrication and test equipment upon the product lot.

FIG. 5c is a symbol for a transition to a lower level of the model, such as from the first model level 405 to the second model level for simulation of a sub-component of the model. The sub-component provides a model for describing components of the factors of the fabrication and testing equipment that are similar and therefore can be described with essentially the same model.

FIG. 5d provides the symbol for a time transition. A time transition provides a timer function that can be used to impart the timing factors for a process either as a delay for such events as an equipment set-up or the timing for execution of a particular process such as a time for diffusion of impurities into a surface of a semiconductor wafer. In this analysis of the model for scheduling, the timing of the process is crucial in creating the optimum scheduling.

FIG. 5e is a mapping transition that modifies the attributes of a product lot when the mapping transition is fired. The updates the attribute with the arrival of a token to the mapping transition. The new attribute information of the token are then passed to the next component of the Petri-net for evaluation or decision. The mapping transition may be used within the Petri-net description of a manufacturing system to provide exception handling during a simulation of the manufacturing system. In the semiconductor processing system, the attributes include the total number of wafers being processed, the number of wafers that have been processed, lot status of wafers being processed, and a reason for any failures within the manufacturing system.

FIG. 5f illustrates a state place, which is an indication of a wait state. The product lot comes to this place waiting for a next transition. Multiple product lots that have arrived and are awaiting the following event necessary for the transition from the state place to occur are identified as tokens. This is analogous to queue with the tokens representing the objects on the queue.

FIG. 5g is the symbol for a stochastic transition. In the models for the simulation of the scheduling and dispatching of this invention. The stochastic transition represents such events as breakdown of the fabrication and test equipment.

Colored and Timed Petri-nets are known in the art as illustrated in Salimifard, et al. disclosed above. Having various types of transitions in the Petri-nets for timing and differentiation of the types of transitions (immediate transition, micro-transition, mapping transition, and stochastic transition) are employed to provide appropriate detail and variation for the models of the fabrication and test equipment of the manufacturing line to develop the optimum scheduling of the product lots.

Returning now to FIG. 6, the model illustrated describes the types of capabilities 450a, . . . , 450b, . . . , 450n required for the fabrication and test equipment. These capabilities 450a, . . . , 450b, . . . , 450n are micro-transitions that point to sub-Petri-nets describing the structure and function of the capabilities. These are chosen based on the requirements of the product lots being scheduled for processing.

Figure 7:
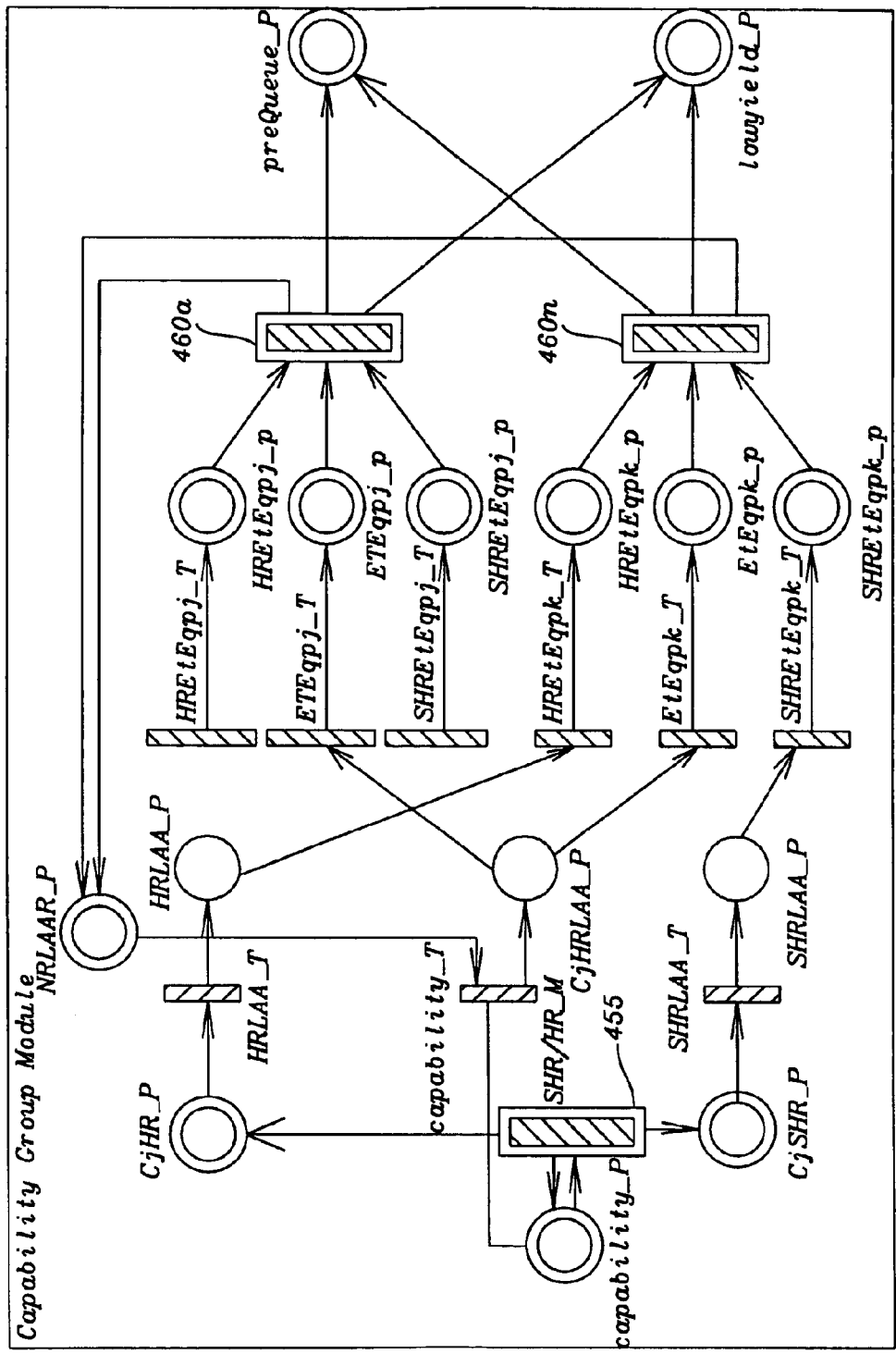
Figure 8:
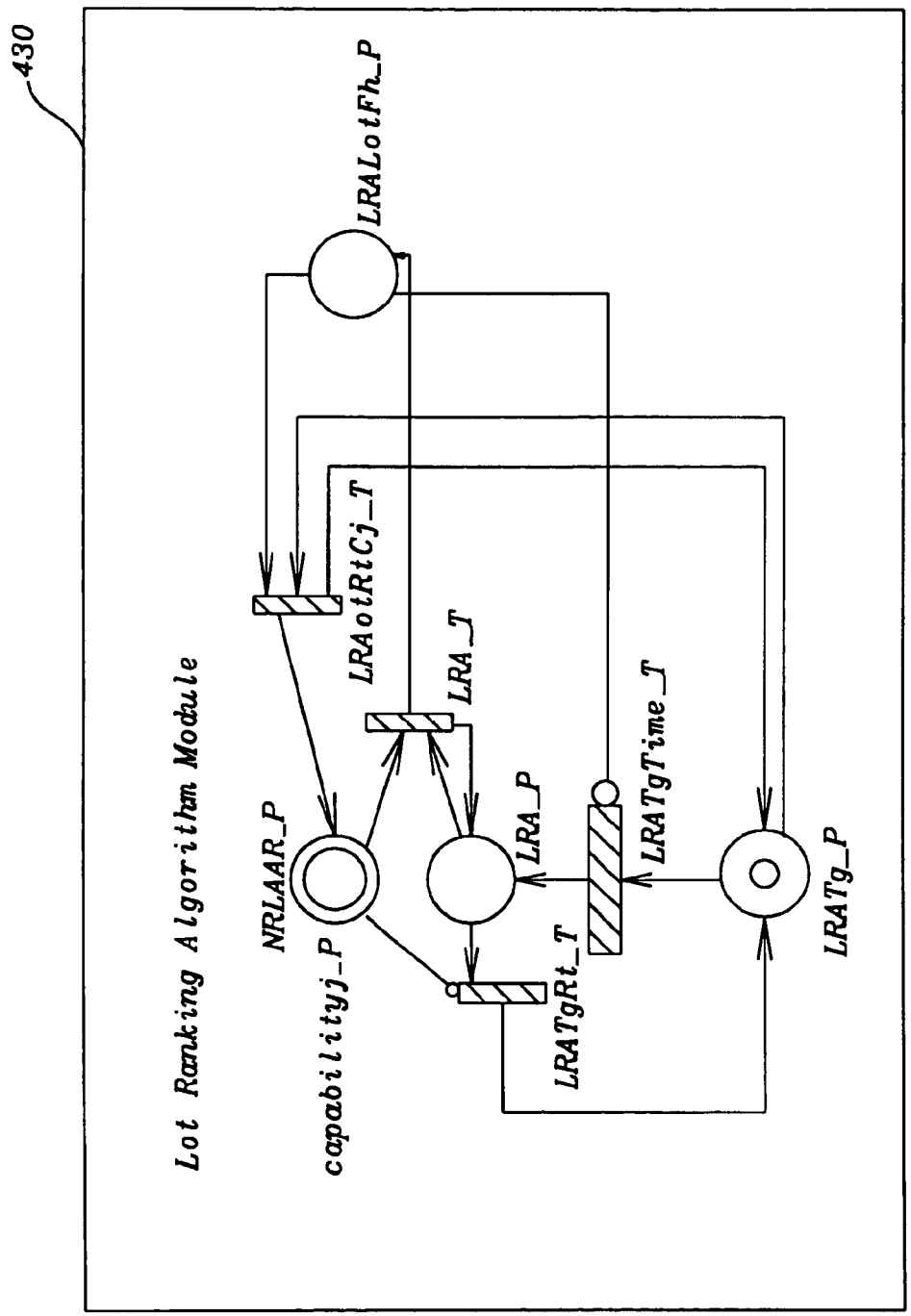

Two examples of the second level Petri-net model 410 for a group of fabrication and test equipment of FIG. 4 are shown in FIGS. 7 and 8. The first model 425, as shown in FIG. 7, illustrates the inclusion of an interruption of the dispatching of a particular lot for processing by arrival of a higher priority lot of product to be processed. This interruption is a micro-transition describing stochastically the probability of the interruption: The model has the micro-transitions 460a, . . . , 460n to execute the models for the attributes of the actual equipment. The second model 430 is shown as the second level of the Petri-net models 410, as shown in FIG. 8, exemplifies the Petri-net model for a lot ranking algorithm for a particular scheduling of the fabrication and testing of a particular product lot.

Figure 9A:
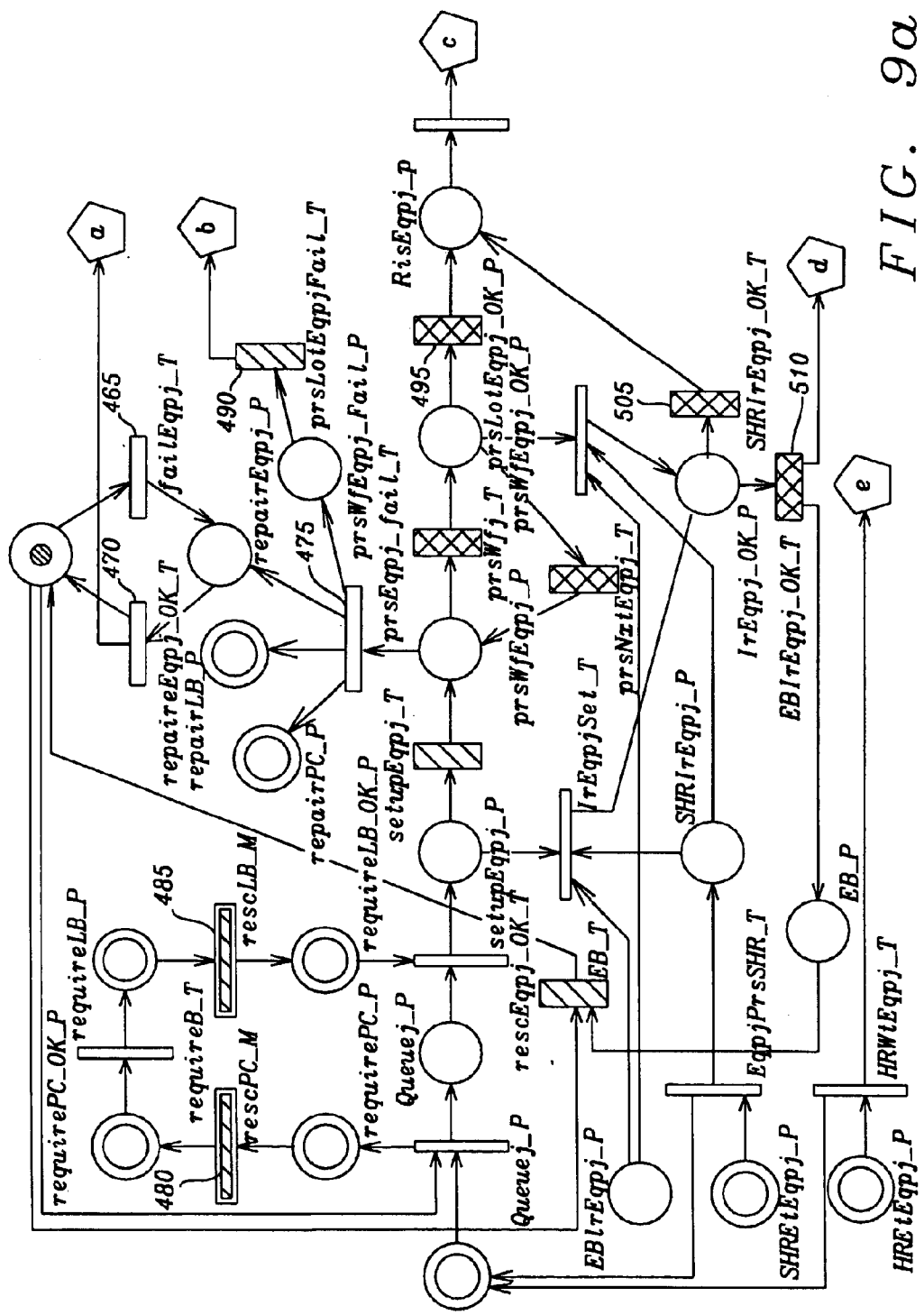
Figure 9B:
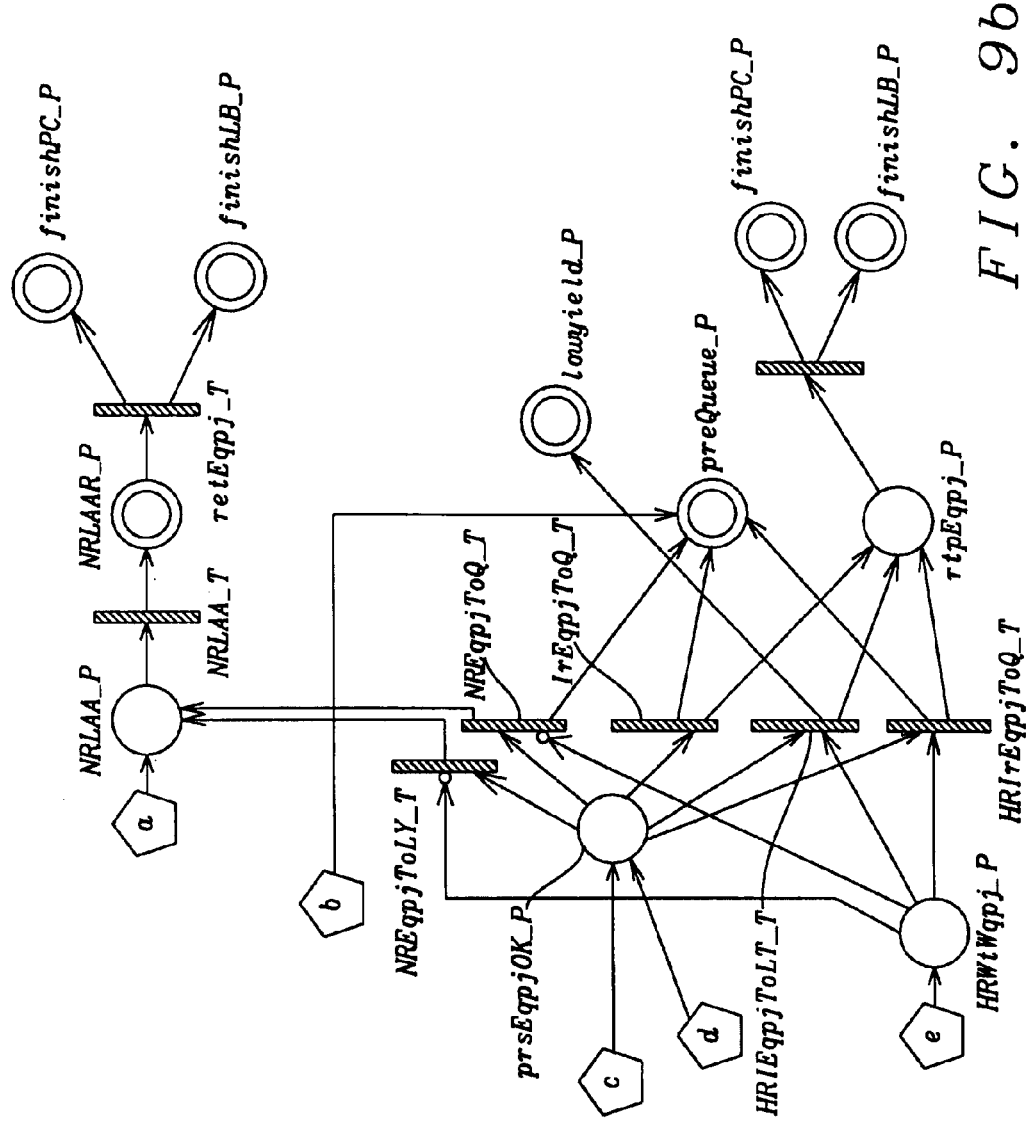
Figure 11:
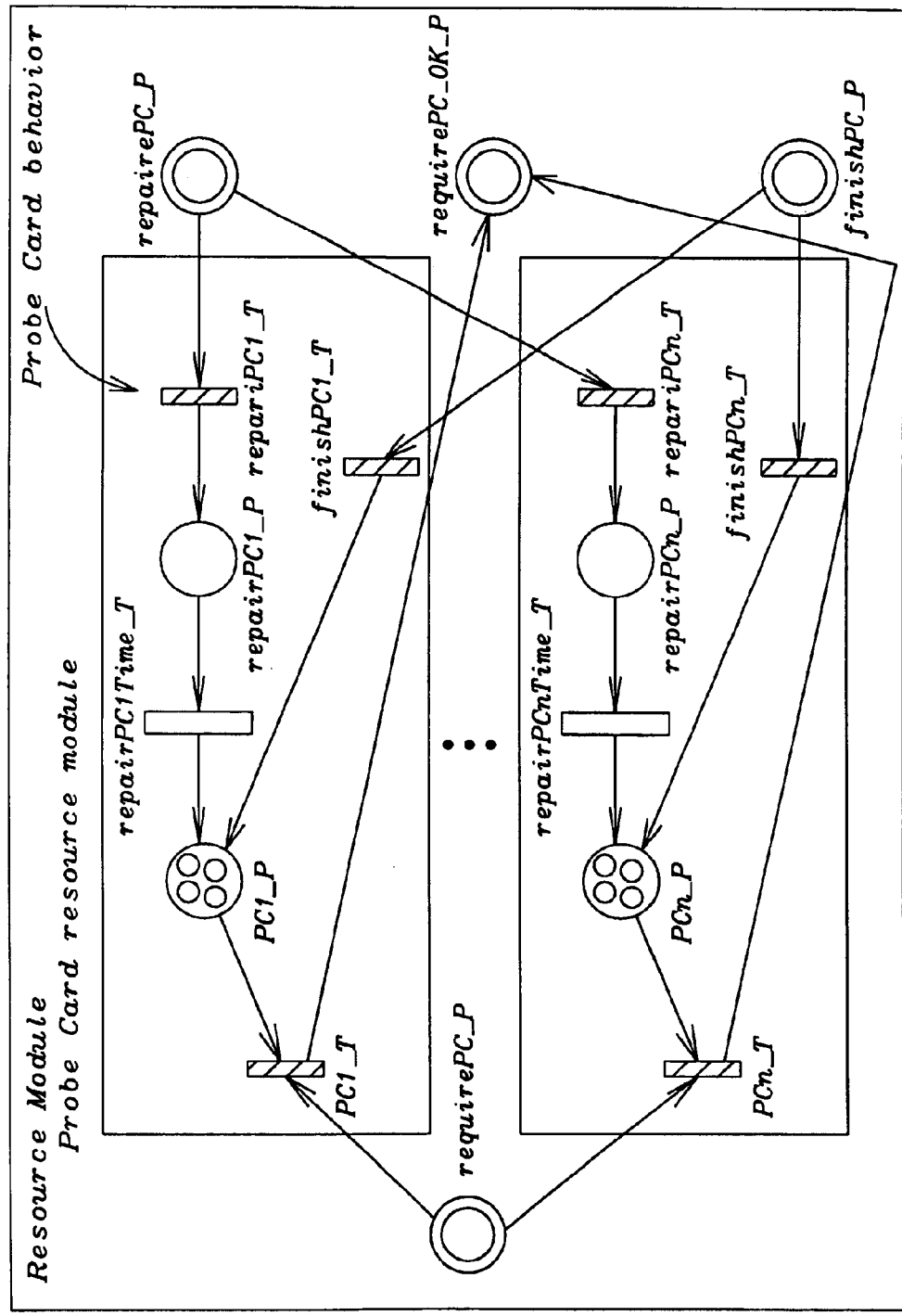

At the third level 415 of FIG. 4, the module describing the behavior of the fabrication and test equipment is shown in FIGS. 9a and 9b. The model includes the stochastic transitions 465, 470, and 475 that describes the probabilistic occurrence of failure, repair, and maintenance of the fabrication and test equipment. The micro-transitions 480 and 485 are examples of the Petri-net models for components of the equipment. An example of this probe card model is shown in FIG. 11. This module includes the probability of a failure in a probe card and the time for execution of the probing of an integrated circuit during the testing of the integrated circuit. The module description further includes the mapping transitions 490, 495, 500, 505, and 510. The mapping transition 490 updates the number of wafers processed that have failed due to failure of processing equipment. The mapping transition 495 provides an update to th lot status for those wafers that are ready to be processed. The mapping transition 500 provides the update of the lot status to indicate that the number of wafers that have completed processing. The mapping transition 505 provides an indication that a lot has been interrupted by a high priority product lot (super hot), if the high priority product lot interrupt place has been past through the Petri-net simulation. The mapping transition 510 updates the lot status to indicate that the current lot of product being processed has been interrupted by a scheduling of an unexpected lot of product. The unexpected lot of product would be, for example, an engineering booking machine which provides the scheduling for processing of technology evaluation test sites. The mapping transition 510 is updated upon the triggering of activity of a model for previous piece of equipment.

Figure 10:
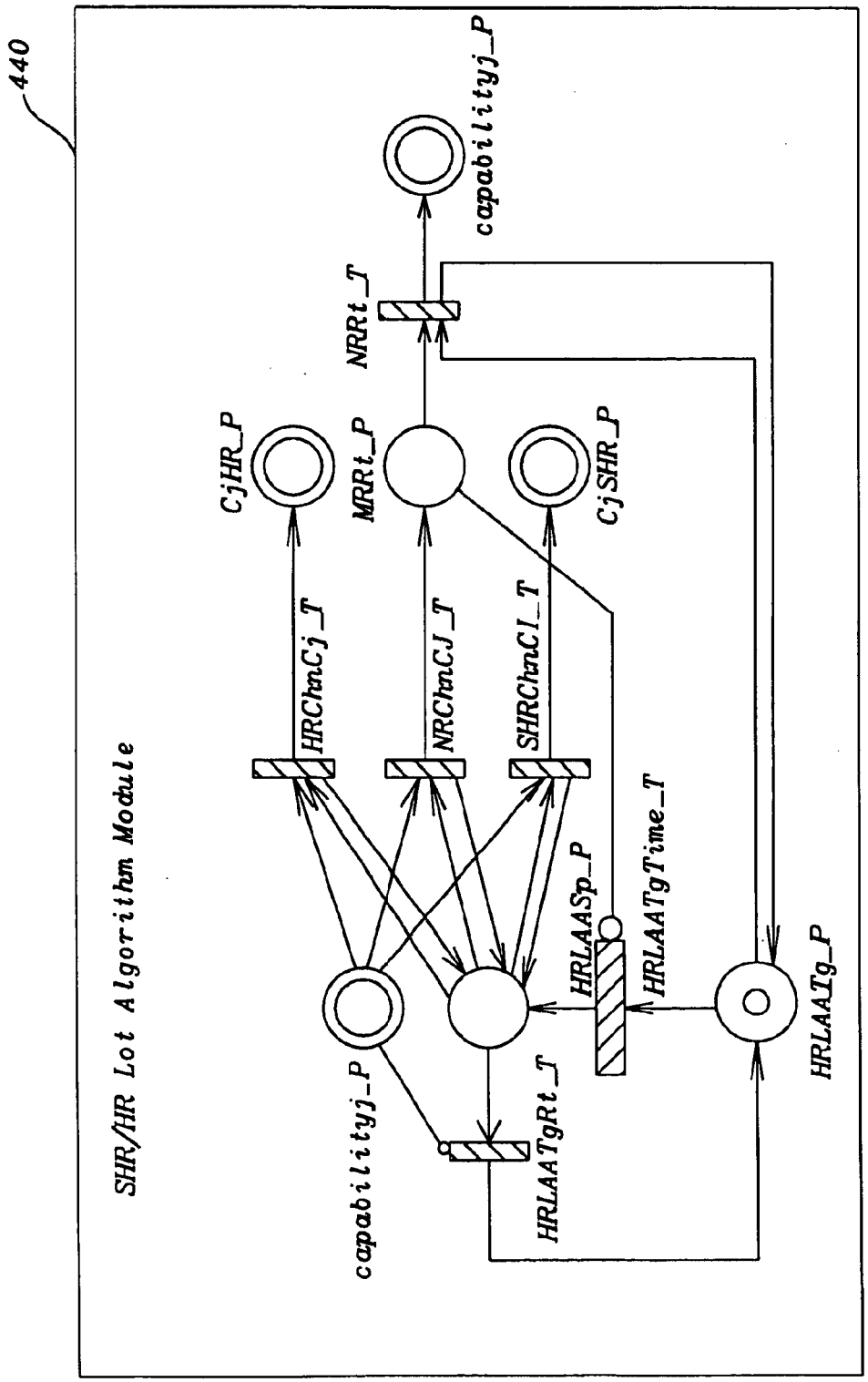

The example 440 of the heuristic models for arrival of high priority product lots (hot lot or super hot lot) cause interruptions to the scheduling and dispatching of lots in a normal flow is shown in FIG. 10. This model provides a representation of the delays to the scheduled product lots that occur as a result of the arrival of the high priority product lots. The structure is such that the magnitude of the delays is based on a heuristic selection of the high priority lots generally based on a normal distribution of probabilities of arrival of the high priority lot.

The manufacturing system as shown in FIG. 2 is configured to include a computing system for executing a program code that performs the method of FIG. 3. This system in performing the method configures itself to virtually act as manufacturing and test scheduling system for scheduling and dispatch of the fabrication of product and of verification of function. The manufacturing and test scheduling system has a product requirement and allocation generator. The product and allocation generator receives product forecast information, product order information, product process equipment information to generate a product lot scheduling. The product lot scheduling is transferred to a manufacturing equipment model generator. The manufacturing equipment model generator receives a product capability and capacity schedule and the product process equipment information to generate a simulation model for fabrication and testing of the product. The simulation model in the preferred embodiment is a Petri-net model as shown in FIG. 4 having the level shown in FIGS. 6–11. The simulation model includes equipment set-up, equipment break-down, and equipment repair. Further, the simulation model includes a probability factor for unanticipated interruption for fabrication and test of high priority product.

The simulation model is transferred to a manufacturing simulator. The manufacturing simulator receives an equipment dispatch algorithm and a candidate product lot scheduling as input to the simulation model to determine whether the product lot scheduling and the equipment dispatch algorithm are optimized. If the product lot scheduling is not optimized, the product requirement and allocation generator is informed to modify the product lot scheduling. If the product lot scheduling is optimized, the product is dispatched for fabrication and testing. If the equipment dispatch algorithm is not optimized, the equipment dispatch algorithm is modified and the simulation model re-simulated to determine if the product lot scheduling and the equipment dispatch algorithm are optimized.

This invention is described for scheduling and dispatching of production lot orders for fabrication and test within a manufacturing line. The method and apparatus as described, however, can be utilized to perform "What it?" analysis. The analysis examines the effects of modifying the production lot dispatch algorithm, the addition or deletion of fabrication and test equipment to the inventory, modification of the performance factors of the fabrication and test equipment available in the inventory, the increase or decrease in the product lot orders received, or the effect of differing distributions for the stochastic variables such as the arrival of the higher priority production orders. Varying these factors allows for testing the configuration of the manufacturing line, the scheduling of product lot orders, and the algorithm by which each lot is dispatched for fabrication and test.

While this invention has been particularly shown and described with reference to the preferred embodiments thereof, it will be understood by those skilled in the art that various changes in form and details may be made without departing from the spirit and scope of the invention.

The invention claimed is:

1. A method for scheduling fabrication and testing of product within a manufacturing line comprising the steps of:

a) creating a process equipment model for equipment and processes within said manufacturing line;

b) generating a potential product dispatch schedule for the product to be fabricated within said manufacturing line;

c) defining an equipment dispatch schedule for equipment employed in fabrication and testing of said product to be fabricated according to said product dispatch schedule;

d) simulating said potential product dispatch schedule;

e) determining if said potential product dispatch schedule is optimized;

f) if said product dispatch schedule is not optimized, generating another potential product dispatch schedule for said product and performing steps b) through e); and g) if said product dispatch schedule is optimized, dispatching said products for fabrication and test according to said schedule;

wherein the process equipment model is described as a Petri-Net model to express the function of the process equipment during fabrication and test of said product.

2. The method of claim 1 wherein said process equipment model includes equipment set-up, equipment break-down, and equipment repair.

3. The method of claim 1 wherein the process equipment model includes a probability factor for unanticipated interruption for fabrication and test of high priority product.

4. The method of claim 1 further comprising the steps of:

determining if said equipment dispatch schedule is to be changed; and if said equipment dispatch schedule is to be changed, modifying said equipment dispatch schedule and performing steps d) through g).

5. An apparatus for scheduling fabrication and testing of product within a manufacturing line comprising:

a) means for creating a process equipment model for equipment and processes within said manufacturing line;

b) means for generating a potential product dispatch schedule for product to be fabricated within said manufacturing line;

c) means for defining an equipment dispatch schedule for equipment employed in fabrication and testing of said product to be fabricated according to said product dispatch schedule;

d) means for simulating said potential product dispatch schedule;

e) means for determining if said potential product dispatch schedule is optimized;

f) means for generating another potential product dispatch schedule for said product and activating the means of b) through e), if said product dispatch schedule is not optimized; and g) means for dispatching said products for fabrication and test according to said schedule, if said product dispatch schedule is optimized;

wherein the process equipment model is described as a Petri-Net model to express the function of the process equipment during fabrication and test of said product.

6. The apparatus of claim 5 wherein the process equipment model includes a probability factor for unanticipated interruption for fabrication and test of high priority product.

7. The apparatus of claim 5 wherein said process equipment model includes equipment set-up, equipment break-down, and equipment repair.

8. The apparatus of claim 5 further comprising:

means for determining if said equipment dispatch schedule is to be changed; and means for modifying said equipment dispatch schedule and activating the means of d) through g), if said equipment dispatch schedule is to be changed.

9. A manufacturing and test scheduling system for scheduling and dispatch of the fabrication of product and of verification of function of said product comprising:

a product requirement and allocation generator which receives product forecast information, product order information, product process equipment information to generate a product lot scheduling;

a manufacturing equipment model generator which receives a product capability and capacity schedule and the product process equipment information to generate a simulation model for fabrication and testing of said product; and a manufacturing simulator which receives an equipment dispatch algorithm and is in communication with said manufacturing equipment model generator to receive said simulation model and in communication with said product requirement and allocation generator to receive a candidate product lot scheduling to simulate and simulation model using said candidate product lot scheduling to determine if said product lot scheduling and said equipment dispatch algorithm are optimized, whereby:

if said product lot scheduling is not optimized, informing said product requirement and allocation generator to modify said product lot scheduling, if said product lot scheduling is optimized, initiating dispatching said product for fabrication and testing; and if said equipment dispatch algorithm is not optimized, modifying said equipment dispatch algorithm and re-simulating said simulation model to determine if said product lot scheduling and said equipment dispatch algorithm are optimized.

10. The manufacturing and testing scheduling system of claim 9 wherein said simulation model for fabrication and testing of said product includes equipment set-up, equipment break-down, and equipment repair.

11. The manufacturing and testing scheduling system of claim 9 wherein the simulation model for fabrication and testing of said product includes a probability factor for unanticipated interruption for fabrication and test of high priority product.

12. The manufacturing and testing scheduling system of claim 9 wherein the simulation model for fabrication and testing of said product is described as a Petri-Net model to express the function of the process equipment during fabrication and test of said product.

13. A manufacturing system for the fabrication and testing of product comprising:

manufacturing and test scheduling system for scheduling and dispatch of the fabrication of product and of verification of function of said product comprising:

a product requirement and allocation generator which receives product forecast information, product order information, product process equipment information to generate a product lot scheduling;

a manufacturing equipment model generator which receives a product capability and capacity schedule and the product process equipment information to generate a simulation model for fabrication and testing of said product; and a manufacturing simulator which receives an equipment dispatch algorithm and is in communication with said manufacturing equipment model generator to receive said simulation model and in communication with said product requirement and allocation generator to receive a candidate product lot scheduling to simulate and simulation model using said candidate product lot scheduling to determine if said product lot scheduling and said equipment dispatch algorithm are optimized, whereby:

if said product lot scheduling is not optimized, informing said product requirement and allocation generator to modify said product lot scheduling, if said product lot scheduling is optimized, initiating dispatching said product for fabrication and testing; and if said equipment dispatch algorithm is not optimized, modifying said equipment dispatch algorithm and re-simulating said simulation model to determine if said product lot scheduling and said equipment dispatch algorithm are optimized.

14. The manufacturing system of claim 13 wherein said simulation model for fabrication and testing of said product includes equipment set-up, equipment break-down, and equipment repair.

15. The manufacturing system of claim 13 wherein the simulation model for fabrication and testing of said product includes a probability factor for unanticipated interruption for fabrication and test of high priority product.

16. The manufacturing system of claim 13 wherein the simulation model for fabrication and testing of said product is described as a Petri-Net model to express the function of the process equipment during fabrication and test of said product.

17. A medium for retaining a computer program for scheduling fabrication and testing of product within a manufacturing line, said computer program executed on a computer system performs the program process comprising the steps of:

a) creating a process equipment model for equipment and processes within said manufacturing line;

b) generating a potential product dispatch schedule for product to be fabricated within said manufacturing line;

c) defining an equipment dispatch schedule for equipment employed in fabrication and testing of said product to be fabricated according to said product dispatch schedule;

d) simulating said potential product dispatch schedule;

e) determining if said potential product dispatch schedule is optimized;

f) if said product dispatch schedule is not optimized, generating another potential product dispatch schedule for said product and performing steps b) through e); and g) if said product dispatch schedule is optimized, dispatching said products for fabrication and test according to said schedule;

wherein the process equipment model is described as a Petri-Net model to express the function of the process equipment during fabrication and test of said product.

18. The medium for retaining a computer program of claim 17 wherein said process equipment model includes equipment set-up, equipment break-down, and equipment repair.

19. The medium for retaining a computer program of claim 17 wherein the process equipment model includes a probability factor for unanticipated interruption for fabrication and test of high priority product.

20. The medium for retaining a computer program of claim 17 wherein the program further comprises the steps of:

determining if said equipment dispatch schedule is to be changed; and if said equipment dispatch schedule is to be changed, modifying said equipment dispatch schedule and performing steps d) through g).

* * * * *